June 25, 1929. J. L. SMITH ET AL 1,718,802
HEAT PROJECTING WINDSHIELD WIPER
Filed Dec. 22, 1927
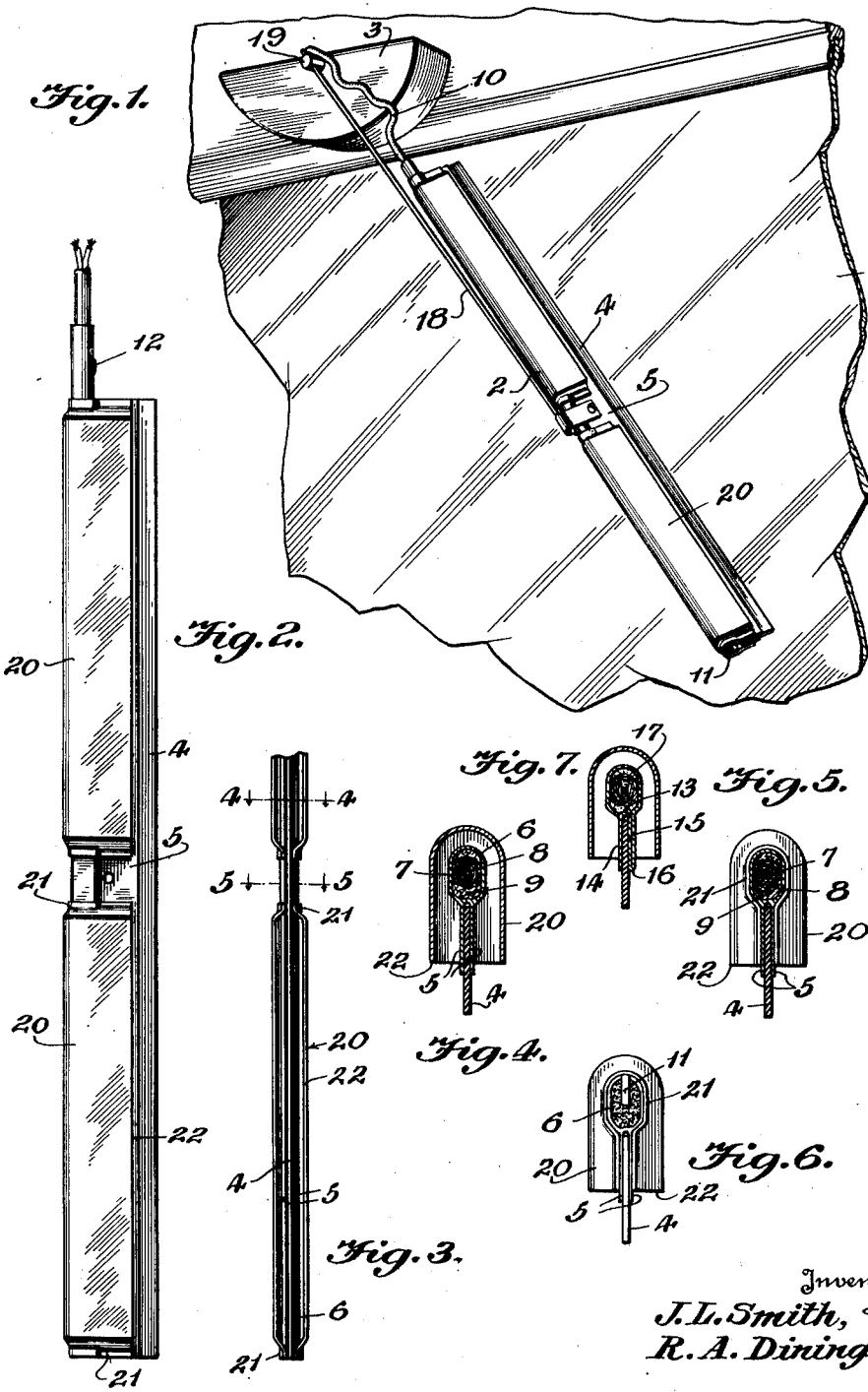
Inventor
J. L. Smith, and
R. A. Dininger.
By
Eccleston & Eccleston,
Attorneys

Patented June 25, 1929.

1,718,802

UNITED STATES PATENT OFFICE.

JOSEPH L. SMITH AND RAY A. DININGER, OF PLYMOUTH, OHIO.

HEAT-PROJECTING WINDSHIELD WIPER.

Application filed December 22, 1927. Serial No. 241,804.

This invention relates to windshield wipers or cleaners, and has for its primary object to combine with a wiper a heating device which will project heat onto the exterior surface of the windshield so as to prevent the collection of snow or ice on the windshield, or if it has previously been deposited on the shield, then to melt or soften the deposited material and remove it by means of the rubber strip or squeegee forming a part of the wiper.

Another object of the invention resides in devising a heater which may be readily applied to the ordinary or conventional windshield cleaners now in use.

Other objects and advantages of the invention will be apparent from the following description when taken in connection with the accompanying drawing in which, Figure 1 is a perspective view of a portion of a windshield showing our improved wiper in place thereon.

Figure 2 is a side elevation of the combined heater and wiper.

Figure 3 is a fragmentary edge view of the device.

Figures 4 and 5 are transverse sectional views taken on lines 4—4 and 5—4 respectively of Figure 3.

Figure 6 is an end view of the device, and,

Figure 7 is a transverse section through a modified construction.

Referring to the drawing more in detail the numeral 1 designates a portion of an ordinary windshield of an automobile, and mounted on the exterior thereof is the combined heater and wiper which is indicated generally by the numeral 2. This wiper may, of course, be automatically operated in any preferred manner, such as the conventional motor 3 indicated in Figure 1.

The wiper which comprises a strip of rubber or the like 4 clamped between the metal plates 5, is provided with a longitudinally extending pocket 6 integrally connected with the plates 5 and extending from end to end of the wiper. Within the pocket 6 is a resistance wire 7 which is preferably wrapped in asbestos 8 and then surrounded by a packing 9 of plaster Paris or the like. This resistance wire has its inner end connected to one of the wires in the cable 10, the other end of the wire 7 being electrically connected, as at 11, to the end of the metal pocket or sleeve 6. The other of the two wires in cable 10 is, of course, electrically connected to the sleeve 6, so as to complete the circuit through the battery or other source of electrical energy.

It should be here noted that while the plates 5 which grip the rubber strip 4 are shown in Figures 1 to 6 as soldered or otherwise connected to the tube or cylindrical pocket 6, the device may, nevertheless, be bent up from a single sheet of metal as indicated in Figure 7. In this form of the wiper the metal sheet is bent as indicated at 13 so as to provide the two side plates 14 and 15 and is then bent at 16 and extended upwardly and then bent around in the form of an arch at 17 to provide the pocket for the heating element. The edge of the strip is then soldered or otherwise connected to the wall or plate 14.

The wiper may be mounted in the usual manner on an arm 18 which is attached to the oscillatable shaft 19 operated by the motor.

An electric current passing through the resistance wire 7 will become rapidly heated and the heat will be transmitted through the asbestos wrapping 8 and plaster of Paris 9 to the metal jacket 6. As thus constituted, however, the heated wiper would have no effect whatever on ice or snow on the windshield since the heat would be rapidly dissipated by the wind, hail, snow, etc., by reason of the wiper being exposed to these elements. Accordingly, we have found it desirable to employ one or more jackets or reflectors 20, preferably of metal, which enclose three sides of the wiper but leave the remaining side open so that the heat generated may be projected onto the windshield and also in order that the rubber strip 4 may extend into contacting relationship with the windshield. In the embodiment of the invention shown herein two metal strips are employed and are spaced apart at the center of the wiper so as to permit the operating arm 18 to be secured directly to the wiper 6. Each of these strips is bent transversely into substantially U-shape and placed over the back of the wiper, but spaced therefrom as indicated in Figure 4. The end edges of the jackets are crimped or bent inwardly as indicated at 21 into contact with the body of the wiper and are soldered or otherwise permanently connected thereto. The longitudinal edges 22 of the jackets extend to a plane slightly above the free edges of the plates 5—5 so as to approach as near as possible to the windshield without disturbing the action of the wiper strip 4.

In the operation of the device, the current being turned on through the resistance wire 7, the wiper 6 will quickly become heated, and this heat will then be radiated off into the air within the reflectors or jackets 20, from whence it will be projected through the open sides of the reflectors onto the windshield. The current of hot air being projected onto a limited area of the windshield will rapidly melt any snow or ice collected thereon; or if set in operation before being exposed to the elements, will heat the windshield sufficiently to prevent snow or ice from adhering thereto. In instances where the snow or ice has already collected and is then acted on by the heater it will be understood that the oridnary action of the wiper will serve to remove the melting or partly melted material.

From the foregoing description it will be apparent that we have devised an exceedingly simple construction of windshield wiper and heating apparatus which can be manufactured at low cost; is strong and durable in operation; that the heater is so designed as to concentrate the heat at the desired section of the windshield; and that the shield or reflector for the heat is so constructed as to be applicable to practically all types of windshield wipers.

In accordance with the patent statutes, we have described what we now believe to be the best embodiment of the invention, but it will be understood that the device is susceptible of minor changes in construction without departing from the spirit of the invention, and all such modifications are intended to be included within the scope of the appended claim.

What we claim as new and desire to secure by Letters Patent is:

A windshield wiper including a wiper element, a heating unit mounted on the wiper, an operating arm secured to the wiper intermediate the ends of the latter, and a pair of U-shaped reflectors mounted on said combined wiper and heater at opposite sides of the attaching means of said arm and having their end edges bent inwardly and secured to the wiper and heating unit.

JOSEPH L. SMITH.
RAY A. DININGER.